(12) United States Patent
Tal et al.

(10) Patent No.: US 6,594,655 B2
(45) Date of Patent: Jul. 15, 2003

(54) WILDCARDS IN RADIX- SEARCH TREE STRUCTURES

(75) Inventors: Alex Tal, Hadera (IL); Roostam Tiger, Haifa (IL); Shifra Rachamim, Kefar Tavor (IL); Itzchak Gabbay, Haifa (IL)

(73) Assignee: Ezchip Technologies Ltd., Yokneam Ilit (IL)

( * ) Notice: Subject to any disclaimer, the term of this patent is extended or adjusted under 35 U.S.C. 154(b) by 120 days.

(21) Appl. No.: 09/753,690

(22) Filed: Jan. 4, 2001

(65) Prior Publication Data

US 2002/0143747 A1 Oct. 3, 2002

(51) Int. Cl.[7] .............................................. G06F 17/30
(52) U.S. Cl. .............................................. 707/3; 707/1
(58) Field of Search ........................... 707/1, 100, 102; 370/408, 255

(56) References Cited

U.S. PATENT DOCUMENTS

| | | | | |
|---|---|---|---|---|
| 5,546,390 A | * | 8/1996 | Stone | 370/408 |
| 5,787,430 A | | 7/1998 | Doeringer et al. | 707/100 |
| 5,873,078 A | * | 2/1999 | Angle et al. | 707/102 |
| 6,029,170 A | * | 2/2000 | Garger et al. | 707/1 |
| 6,041,053 A | * | 3/2000 | Douceur et al. | 707/100 |
| 6,223,174 B1 | * | 4/2001 | Ladwig et al. | 707/1 |
| 6,298,340 B1 | * | 10/2001 | Calvignac et al. | 370/255 |
| 6,396,842 B1 | * | 5/2002 | Rochberger | 370/255 |

OTHER PUBLICATIONS

Paul Tsuchiya, (A Search algorithm for table entries with non–contiguous wildcarding.*

P. Francis Tsuchiya. A search algorithm for table entries with non–contiguous wildcarding. Known as "Cecilia," available from the author francis@aciri.org, 1991.*

* cited by examiner

Primary Examiner—Diane D. Mizrahi
Assistant Examiner—Yicun Wu
(74) Attorney, Agent, or Firm—Mark M. Friedman

(57) ABSTRACT

A system for storing and retrieving data using a radix-search tree having a plurality of sub-trees containing nodes and leaves, the system including: (a) a data storage module designed and configured for storing the plurality of sub-trees, wherein at least one of the leaves contains at least one entry having at least one wildcard in a primary position, and (b) a processor that is operative to perform operations including: (i) building the radix-search tree in the data storage module, and (ii) retrieving data from the radix-search tree in the data storage module.

31 Claims, 11 Drawing Sheets

Average search length =

2*1 + 4*2 + 16*3 + 32*3 =

154

WILDCARDS IN RADIX- SEARCH TREE STRUCTURES

FIELD AND BACKGROUND OF THE INVENTION

The present invention relates to radix-tree search structures and, in particular, it concerns radix-tree search structures having the ability to handle wildcards in any location within an entry.

A large number of computing or networking tasks require recognizing keys from a database, such as a lookup table in a computer network or dictionaries in general. After establishing a match between the search key and a data sequence from the database, either the information linked to this search key is retrieved or a program driven by this search key is executed.

In communication networks consisting of a number of interconnected users or nodes, data can be sent from one node to any other. Specialized nodes called routers are responsible for delivering or "forwarding" the data to their destination. By analogy, the routers act as post offices. As letters, any of the data sent through a communication network contains information about the destination address, generally as part of a so-called header.

Each router compares this information or at least part of it with a list of addresses stored internally. If a match between stored addresses and the destination address is found, the router establishes a path leading to the destination node. Depending on the size of the network and its structure, the data are either directly forwarded to their destination or sent to another (intermediate) router, very much the same way a letter is passed through several post offices until reaching its final address (if ever).

The explosive growth of the Internet has forced a review of address assignment policies. The traditional uses of general purpose networks have been modified to achieve better use of IP's 32-bit address space. Classless Inter Domain Routing (CIDR) is a method currently being deployed in the Internet backbones to achieve this added efficiency. CIDR depends on deploying and routing to arbitrarily sized networks. In this model, hosts and routers make no assumptions about the use of addressing in the internet. The Class D (IP Multicast) and Class E (Experimental) address spaces are preserved, although this is primarily an assignment policy.

By definition, CIDR comprises three elements:
topologically significant address assignment,
routing protocols that are capable of aggregating network layer reachability information, and
consistent forwarding algorithm ("longest match").

The use of networks and subnets is now historical, although the language used to describe them remains in current use. They have been replaced by the more tractable concept of a network prefix. A network prefix is, by definition, a contiguous set of bits at the more significant end of the address that defines a set of systems; host numbers select among those systems. There is no requirement that all the internet use network prefixes uniformly. To collapse routing information, it is useful to divide the internet into addressing domains. Within such a domain, detailed information is available about constituent networks; outside it, only the common network prefix is advertised.

The classical IP addressing architecture used addresses and subnet masks to discriminate the host number from the network prefix. With network prefixes, it is sufficient to indicate the number of bits in the prefix. Both representations are in common use. Architecturally correct subnet masks are capable of being represented using the prefix length description.

An effect of the use of CIDR is that the set of destinations associated with address prefixes in the routing table may exhibit subset relationship. A route describing a smaller set of destinations (a longer prefix) is said to be more specific than a route describing a larger set of destinations (a shorter prefix); similarly, a route describing a larger set of destinations (a shorter prefix) is said to be less specific than a route describing a smaller set of destinations (a longer prefix). Routers must use the most specific matching route (the longest matching network prefix) when forwarding traffic.

Thus, the CIDR routing method provides an excellent example of the necessity of having partial or prefix matching ability within a data structure for retrieving keys.

The data structure of the invention is a database organized as tree. A tree consists of a number of nodes, each of which possibly branch or point to other nodes.

A class of trees is known in which the key is stored in the node. A decision whether and to which node to branch implies a comparison between the search key and those stored in the node. The result of this comparison determines the choice of the following subtree. Typically, binary search trees belong to this class. The main disadvantage of this class of trees and its corresponding search method is that all bits of the key are in the worst case compared k times, k denoting the maximum number of levels within the tree.

In another approach, termed radix-search methods, the search proceeds by examining the search keys one small piece at a time, rather than using full comparisons between keys at each step. Radix-search methods are particularly suited to handling variable-length keys. They also provide reasonable worst-case performance. Two important disadvantages, noted by R. Sedgewick ("Algorithms in C++", Addison Wesley, 1998), are that such search methods can make inefficient use of space, and that performance can suffer if efficient access to the bytes of the keys is not available.

In another class of trees known as "tries", the keywords or data belonging to these keywords are stored in the terminal nodes or leaves of the tree. When a key is searched or inserted, the bits of the key determine the path to be followed down to a leaf. Trees of this class are called "trie" in the technical field—a term introduced as an allusion to the term "retrieval". If a key, for example, is a sequence of n bits (either 0 or 1), the decision to branch to the left (represented by 0) or to the right (1) at the kth level of the tree is made by using the kth bit of the key sequence, with k being a number between 1 and n. In a data structure belonging to this class, each bit of the key is compared only once.

This data structure is, however, storage consuming: many of these internal nodes may have one empty subtree, and, thus, are traversed without a gain of information.

Such unnecessary internal nodes are eliminated in a compact data structure known as Patricia trie. The Patricia trie is characterized by having a minimum number of internal nodes, or, equally, pointers or key-bit inspections. Each node within a Patricia trie contains information about the bits which characterize the compacted path, e.g., the number of bits to skip before making another bit comparison to decide the direction to branch to. An example of a Patricia trie can be found in: D. E. Knuth, "The Art of Computer Programming", Vol. 3: Sorting and Searching, 1973, pp. 490–493.

Patricia tries handle keys of varying lengths and are characterized by a deterministic structure. Additional characteristics of Patricia tries are summarized by R. Sedgewick ("Algorithms in C++", Addison Wesley, 1998), pp. 637–645. Typical applications include locating strings containing names of different lengths, searching for IP addresses, etc.

To date, however, Patricia tries have been fundamentally incapable of handling keys containing wildcards, with the exception of wildcards at the suffix. When a key is stored in a leaf of a Patricia trie, and the path to the leaf examined is no more than the $k_{th}$ bit out of n bits (n>k), the bits that follow the $k_{th}$ bit have no effect on the tree, such that a plurality of keys that are identical over the first k bits can be stored in a single leaf. Thus, the plurality of keys may be allowed to contain one or more wildcards in the remaining (n–k) bits. It must be emphasized that such wildcards are not part of the tree/node structure, but are contained in the leaves.

The use of strings containing wildcards in the node structure of radix-search trees is particularly problematic. Bits are binary, having values of 0 or 1. A bit containing a wildcard is either, which is actually a third possibility. More importantly, a string having wildcards is actually a plurality of strings, the number of strings ($N_s$) being determined by the following relationship:

$$N_s = 2^{N_w}$$

wherein $N_w$ is the number of wildcards in the string. Thus, the presence of wildcards creates a representation problem compounded by a significant increase in entries in the tree structure, such that both the size and the depth of the tree are appreciably increased.

U.S. Pat. No. 5,787,430 to Doeringer et al. discloses a database having a trie-like structure for storing entries and retrieving an at least partial match, preferably the longest partial match, or all partial matches of a search argument (input key) from the entries, the database having nodes, with each node containing first link information leading to at least one previous node (parent pointer) and second link information leading to at least one following node (child pointer), at least a stored key, or a combination, thereof. The particular structure of the nodes allows a two-step search process, in which segments of a search argument are firstly used to determine a search path through the trie-like database. The search path is subsequently backtracked in the second part of the search. During the second part of the search, the entire search argument is compared to entries stored in the nodes until a match is found. It is claimed that the described database allows an efficient use of memories and is advantageously applied to fast data retrieval, in particular related to communication within computer networks.

In "IP Lookups Using Multiway and Multicolumn Search" (IEEE/ACM TRANACTIONS ON NETWORKING, VOL. 7, NO. 3, JUNE 1999), B. Lampson et al. teach an IP lookup routine using a binary search scheme that is adapted to solve the longest matching prefix problem.

Although several prefix-matching techniques are known, to the best of our knowledge, there are no radix-search trees that are capable of handling wildcards positioned in any location (bit) in the string. The ability to assimilate strings having wildcards positioned in any location in the string is desirable in many applications. For example, if we would like to give special routing priority to all packets addressed to particular individuals within a company, the URL would generally have wildcards located in middle of the string. In another application example, if we would like to give special routing priority to all sessions between departments of a company or between two companies, the session ID may be represented as a concatanation of the two individual addresses, each having wildcard(s) in the suffix. As a result, the concatanated string will have wildcard(s) in middle of the string as well as in the suffix.

There is therefore a recognized need for, and it would be highly advantageous to have, a method for incorporating and retrieving entries in a radix-search tree, wherein one or more wildcards can be present at any location within the string.

SUMMARY OF THE INVENTION

According to the teachings of the present invention there is provided a leaf within a radix-search tree, the leaf including: at least a first entry containing at least one wildcard, the at least a first entry forming at least two single keys that are distinguishable by a node.

According to another aspect of the present invention there is provided a system for storing and retrieving data using a radix-search tree having a plurality of sub-trees containing nodes and leaves, the system including: (a) a data storage module designed and configured for storing the plurality of sub-trees, wherein at least one of the leaves contains at least one entry having at least one wildcard in a primary position, and (b) a processor that is operative to perform operations including: (i) building the radix-search tree in the data storage module.

According to further features in the described preferred embodiments, the processor is further operative to retrieve data from the radix-search tree in the data storage module.

According to yet another aspect of the present invention there is provided a method for storing and retrieving data using a radix-search tree having a plurality of sub-trees for storing at least one set of entries, the plurality of sub-trees containing nodes and leaves, the method including: (a) providing a system including: (i) a data storage module designed and configured for storing the plurality of sub-trees, and (ii) a processor that is operative to perform operations including building the radix-search tree in the data storage module, and (b) storing within the radix-search tree at least one set of entries containing at least one entry having at least one wildcard in a primary position.

According to yet another aspect of the present invention there is provided a method for storing and retrieving data using a radix-search tree having a plurality of sub-trees for storing at least one set of entries, the plurality of sub-trees containing nodes and leaves, the method including: (i) finding at least two split bits within the set of entries; and (ii) selecting one of the at least two split bits according to a best-balanced split criterion.

According to further features in the described preferred embodiments, the at least one wildcard in a primary position is followed by a bit forming a pseudo-node.

According to still further features in the described preferred embodiments, the at least one wildcard in a primary position is followed by a split bit.

According to still further features in the described preferred embodiments, the at least one entry is a plurality of entries, and the at least one wildcard in a primary position is in a suffix position.

According to still further features in the described preferred embodiments, the at least one entry having at least one wildcard in a primary position has a split bit preceding the at least one wildcard and a split bit following the at least one wildcard.

According to still further features in the described preferred embodiments, at least one bit is checked out of order of appearance.

According to still further features in the described preferred embodiments, the building of the radix-search tree in the data storage module includes ordering the nodes of at least one of the sub-trees by examining a bit having a minimum number of wildcards.

According to still further features in the described preferred embodiments, the building the radix-search tree in the data storage module includes ordering the nodes of at least one of the sub-trees by examining a bit providing a best-balanced split of single keys in the sub-tree.

According to still further features in the described preferred embodiments, the bit is selected according to a combination of selection criteria including: (a) a minimum number of wildcards in the sub-tree, and (b) a best-balanced split of single keys in the sub-tree.

According to still further features in the described preferred embodiments, if at least two bits have the minimum number of wildcards, the nodes are ordered at least according to a bit providing a best-balanced split of single keys in the sub-tree.

According to still further features in the described preferred embodiments, the inventive leaf further includes: (b) at least a second entry, the first entry and the second entry being distinguishable by a pseudo-node.

According to still further features in the described preferred embodiments, the (at least a) second entry is a subset of the first entry.

According to still further features in the described preferred embodiments, the (at least a) second entry contains at least one wildcard.

According to still further features in the described preferred embodiments, the (at least a) second entry includes a third entry.

According to still further features in the described preferred embodiments, the storing of at least one set of entries in the radix-search tree includes: (i) finding at least two split bits within the set of entries, and (ii) selecting at least one of the at least two split bits according to a minimum wildcard criterion.

According to still further features in the described preferred embodiments, the storing of at least one set of entries in the radix-search tree includes: (i) finding at least two split bits within the set of entries, and (ii) selecting one of the at least two split bits according to a best-balanced split criterion.

According to still further features in the described preferred embodiments, the storing of at least one set of entries in the radix-search tree includes: (i) finding at least two split bits within the set of entries, and (ii) selecting one of the at least two split bits according to criteria including a minimum wildcard criterion and a best-balanced split criterion.

According to still further features in the described preferred embodiments, the method further includes: (iii) if the minimum wildcard criterion is met by at least two of the split bits, selecting one of the at least two split bits according to a best-balanced split criterion.

According to still further features in the described preferred embodiments, the method further includes: (iv) splitting the selected bit to form a left sub-tree containing at least one entry from the set of entries, and a right sub-tree containing at least one entry from the set of entries.

According to still further features in the described preferred embodiments, the storing of at least one set of entries in the radix-search tree includes: (i) looking for split bits within the set of entries, and (ii) if no split bits are found, building a leaf containing the set of entries.

According to still further features in the described preferred embodiments, the storing of at least one set of entries in the radix-search tree includes: (i) looking for split bits within the set of entries, and (ii) if no split bits are found, and if the entries cannot be inserted in a single leaf, selecting the bit according to a maximal number of pairs criterion.

According to still further features in the described preferred embodiments, the storing of at least one set of entries in the radix-search tree includes: (i) looking for at least one split bit within the set of entries; (ii) if the at least one split bit is found within the set of entries, selecting at least one of the split bits according to a minimum wildcard criterion; (iii) if the minimum wildcard criterion is met by at least two of the split bits, selecting one of the split bits according to a best-balanced split criterion; (iv) if no split bit is found in step (i), and if the set of entries can be inserted in a single leaf, building a leaf containing the set of entries; (v) if no split bit is found in step (i), and if the entries cannot be inserted in a single leaf, selecting the bit according to a maximal number of pairs criterion; and (vi) splitting selected bit to form a left sub-tree containing at least one entry from the set of entries, and a right sub-tree containing at least one entry from the set of entries.

According to still further features in the described preferred embodiments, the method further includes: (b) retrieving at least one entry from the radix-search tree.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
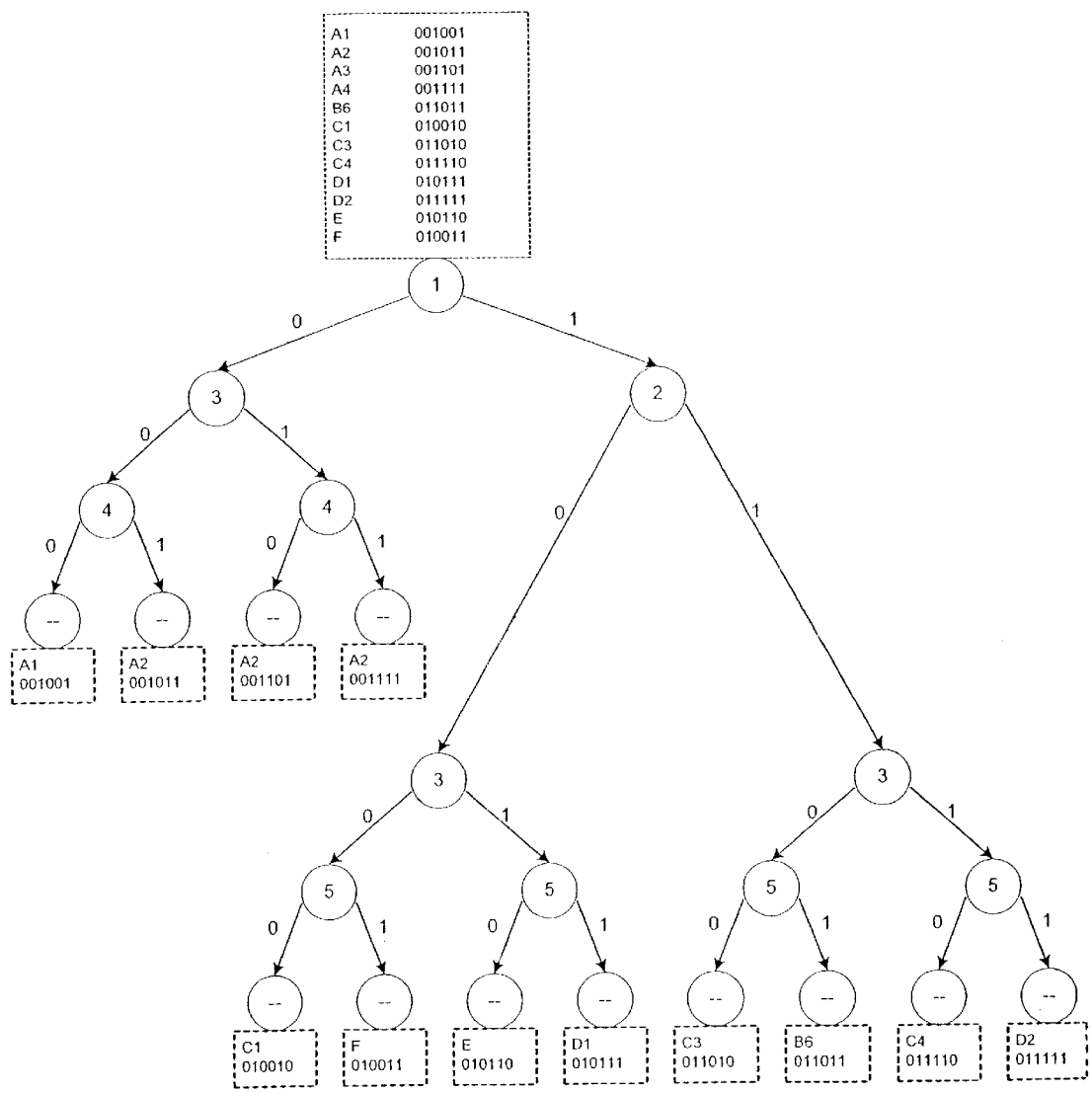
FIG. 1 is a radix-search tree, embodying the wildcard-containing entries provided in Table 1, constructed according to principles of the prior art.

The present invention is a method for incorporating and retrieving entries in a radix-search tree, wherein one or more wildcards can be present at any location within the string. The present invention also provides a method for balancing keys in a radix-search tree structure, such that the depth of the tree and the average search length are considerably improved. Some of the more important applications relate to network processing.

In addition, the tree-updating algorithm of the present invention is designed to provide a quick and efficient means of inserting and deleting entries without the cumbersome and time-consuming need to rebuild the tree structure after each modification.

The invention is based on two fundamental assumptions:

(1) entries do not intersect;

(2) a finest match is always desired.

As used herein in the specification and in the claims section that follows, the expression "finest match" relates to a group of one or more entries, wherein the most specific entry is referred to as the finest match. In terms of set theory, given a plurality of entries at a particular position on the lookup path, the "finest match" will be the entry that is included in all the other entries.

A corollary of (2) is that a less-specific entry that is indistinguishable from a more specific entry at a given point on the lookup path is eliminated.

The principles and operation of the radix-search tree according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

Two of the more popular types of network applications relate to IP addresses and URL (Uniform Resource Locator) identifiers. IP addresses, according to the IPV4 standard, are composed of 32 bit, fixed-length strings, each string subdivided into 4 8-bit units. A typical IP address might be 23.12.97.29 in digital form, or 00010111 00001100 01100001 00011101 in binary form. IP addresses are hierarchical: each succeeding unit, which may be of varying length, is more specific than the preceding unit. As a conceptual example, the IP address 23.12.97.29 can be used to denote milky_way.solar_systems.planets.earth_USA.

Address lookup can be done at high speeds if we are looking for an exact match of the packet destination address to a corresponding address in the routing database. Exact matching can be done using standard techniques such as hashing or binary search. However, most routing protocols (including OS1 and IP) use hierarchical addressing to avoid scaling problems. Rather than have each router store a database entry for all possible destination IP addresses, the router stores address prefixes that represent a group of addresses reachable through the same interface. The use of prefixes allows scaling to worldwide networks. The use of prefixes introduces a new dimension to the lookup problem: multiple prefixes may match a given address. If a packet matches multiple prefixes, it is intuitive that the packet should be forwarded corresponding to the most specific prefix or longest matching prefix.

Thus, if the IP address 23.12.97.29 denotes milky_way.solar_systems.planets.earth_USA wildcards can be used to route a packet from galaxy to galaxy using a significantly-reduced set of database entries of the form:

milky_way.*.*.*.

andromeda.*.*.*.

Often, however, it is desirable to place a wildcard in middle of the address. For example, if we would like to give special routing priority to all packets addressed to all solar systems in all galaxies, the IP address would be of the form

*.solar_systems.*.*, or *.12*.*.

It is not possible to store such a key in radix-search trees of the prior art.

A string having wildcards is actually a plurality of strings, the number of strings ($N_s$) being determined by the following relationship:

$$N_s = 2^{N_w}$$

wherein $N_w$ is the number of wildcards in the string. Thus, the presence of wildcards results in a significant increase in entries in the tree structure, such that both the size and the depth of the tree are appreciably increased.

To illustrate this point, let us use established Patricia methodology and apply it to strings containing wildcards at any location within the string. Because a wildcard represents both a "0" value and a "1" value, each wildcard must essentially expanded to represent both possibilities.

Consider the six entries provided in Table 1. Entry A, 0011, has 2 wildcards, and therefore includes $2^2=4$ specific keys: 001001, 001101, and 001111. Entry B, 011*, has 3 wildcards, and therefore includes $2^3=8$ specific keys. Entry C, 01**10, has 2 wildcards, and therefore includes $2^2=4$ specific keys. The six entries of Table 1 are broken down into specific keys in Table 2, and a refinement procedure is used to eliminate keys coming from less-specific entries. Thus, $B_3$ and $C_2$ are removed in favor of E; $B_1$ is removed in favor of $C_1$, $B_8$ is removed in favor of $D_2$, etc. The remaining keys are provided in Table 3.

TABLE 1

| Bit# | 0 | 1 | 2 | 3 | 4 | 5 |
|---|---|---|---|---|---|---|
| A | 0 | 0 | 1 | * | * | 1 |
| B | 0 | 1 | * | * | 1 | * |
| C | 0 | 1 | * | * | 1 | 0 |
| D | 0 | 1 | * | 1 | 1 | 1 |
| E | 0 | 1 | 0 | 1 | 1 | 0 |
| F | 0 | 1 | 0 | 0 | 1 | 1 |

A radix-search tree embodying the entries of Table 1 is provided in FIG. 1. In Patricia methodology, the bits are examined in order, such that bit 0 would be expected to be the root of the tree. However, a glance at FIG. 1 reveals not only that the root is a node in which bit 1 is checked, but that bit 0 is nowhere to be found. This technique, commonly referred to as "skipping", is based on the observation that when all entries have an identical value at a certain bit, that bit cannot distinguish between the entries. In this case, Bit 0 is skipped because all six entries have an identical value of "0", and the tree-building procedure proceeds to bit 1. Because bit 1 distinguishes between entry A (bit 1=0) and entries B–F (bit 1=1), bit 1 becomes the first node ("root") of the tree.

If the value of bit 1 equals 0, we move left from the root. Only entry A appears on the left-hand side of the tree. From Table 2, we see that Entry A contains 4 keys: $A_1, A_2, A_3, A_4$, all of which equal 1 at bit 2. Thus, bit 2 is skipped, and we proceed to examine bit 3, which contains a wildcard. Bit 3 becomes a node. If the value of bit 3 equals 0, we move left from the node, and examine the next bit. Bit 4 is also a wildcard, and is incorporated as a node on the tree. If the value of bit 4 equals 0, we move left from the node, and arrive at a leaf containing key $A_1$: 001001. If the value of bit 4 equals 1, we move right from the node, and arrive at a leaf containing key $A_2$: 001011.

Similarly, if the value of bit 3 equals 1, we move right from the node, and proceed to examine bit 4. If the value of bit 4 equals 0, we move left from the node, and arrive at a leaf containing key $A_3$: 001101. If the value of bit 4 equals 1, we move right from the node, and arrive at a leaf containing key $A_4$: 001111.

such that only the expanded single entries are stored in the tree. Proceeding to bit 2, if the value of bit 2 equals 0, we move left from the node. Entry E and entry F both equal 0 at bit 2, and are incorporated in the left-hand side of node 2. $B_1–B_4$ from entry B and $C_2$ from entry C have been overridden by more specific keys ($C_1$, $D_1$, E, and F), as shown in Table 2. Proceeding on the left-hand side of node 2, we arrive at bit 3. If the value of bit 3 equals 0, we move left from the node, along with key $C_1$ and entry F. Since bit 4 does not distinguish between key $C_1$ and entry F, we proceed directly to bit 5.

If the value of bit 5 equals 0, we move left from the node, arriving at a leaf containing solely $C_1$. If the value of bit 5 equals 1, we move right from the node, arriving at a leaf containing solely entry F.

The explanation of the rest of the tree follows in a straightforward manner from the explanation above.

The tree of FIG. 1 is particularly cumbersome, containing 4 levels of nodes for most leaves, and at least 3 levels of nodes for the remainder. It would be greatly advantageous to incorporate the entries into a tree which is more shallow and has less branching.

It must be emphasized that leaves of the prior art typically contain a single key. More advanced leaves may contain more than one key, provided that an additional node cannot

TABLE 2

| Bit# | 0 | 1 | 2 | 3 | 4 | 5 | Bit # | 0 | 1 | 2 | 3 | 4 | 5 | Refined by | left |
|---|---|---|---|---|---|---|---|---|---|---|---|---|---|---|---|
| A | 0 | 0 | 1 | * | * | 1 | A1 | 0 | 0 | 1 | 0 | 0 | 1 | | + |
| | | | | | | | A2 | 0 | 0 | 1 | 0 | 1 | 1 | | + |
| | | | | | | | A3 | 0 | 0 | 1 | 1 | 0 | 1 | | + |
| | | | | | | | A4 | 0 | 0 | 1 | 1 | 1 | 1 | | + |
| B | 0 | 1 | * | * | 1 | * | B1 | 0 | 1 | 0 | 0 | 1 | 0 | C1 | |
| | | | | | | | B2 | 0 | 1 | 0 | 0 | 1 | 1 | F | |
| | | | | | | | B3 | 0 | 1 | 0 | 1 | 1 | 0 | C2 = E | |
| | | | | | | | B4 | 0 | 1 | 0 | 1 | 1 | 1 | D1 | |
| | | | | | | | B5 | 0 | 1 | 1 | 0 | 1 | 0 | C3 | |
| | | | | | | | B6 | 0 | 1 | | 0 | 1 | 1 | | + |
| | | | | | | | B7 | 0 | 1 | 1 | 1 | 1 | 0 | C4 | |
| | | | | | | | B8 | 0 | 1 | 1 | 1 | 1 | 1 | D2 | |
| C | 0 | 1 | * | * | 1 | 0 | C1 | 0 | 1 | 0 | 0 | 1 | 0 | | + |
| | | | | | | | C2 | 0 | 1 | 0 | 1 | 1 | 0 | E | |
| | | | | | | | C3 | 0 | 1 | 1 | 0 | 1 | 0 | | + |
| | | | | | | | C4 | 0 | 1 | 1 | 1 | 1 | 0 | | + |
| D | 0 | 1 | * | 1 | 1 | 1 | D1 | 0 | 1 | 0 | 1 | 1 | 1 | | + |
| | | | | | | | D2 | 0 | 1 | 1 | 1 | 1 | 1 | | + |
| E | 0 | 1 | 0 | 1 | 1 | 0 | E | 0 | 1 | 0 | 1 | 1 | 0 | | + |
| F | 0 | 1 | 0 | 0 | 1 | 1 | F | 0 | 1 | 0 | 0 | 1 | 1 | | + |

TABLE 3

| A1 | 0 | 0 | 1 | 0 | 0 | 1 |
|---|---|---|---|---|---|---|
| A2 | 0 | 0 | 1 | 0 | 1 | 1 |
| A3 | 0 | 0 | 1 | 1 | 0 | 1 |
| A4 | 0 | 0 | 1 | 1 | 1 | 1 |
| B6 | 0 | 1 | 1 | 0 | 1 | 1 |
| C1 | 0 | 1 | 0 | 0 | 1 | 0 |
| C3 | 0 | 1 | 1 | 0 | 1 | 0 |
| C4 | 0 | 1 | 1 | 1 | 1 | 0 |
| D1 | 0 | 1 | 0 | 1 | 1 | 1 |
| D2 | 0 | 1 | 1 | 1 | 1 | 1 |
| E | 0 | 1 | 0 | 1 | 1 | 0 |
| F | 0 | 1 | 0 | 0 | 1 | 1 |

Continuing now to the right side of the root (bit 1=1), we need to distinguish between the other remaining keys: $B_6$, $C_1$, $C_3$, $C_4$, $D_1$, $D_2$, E, and F. Prior-art methods cannot handle entries such as B, C, and D, all of which have wildcards in the middle. Hence, there is a need to expand those entries, distinguish between the keys, e.g., in the case of the following keys:

| H: | 010111 |
|---|---|
| I: | 010111010 |
| J: | 0101110 |
| K: | 0101110101 |

Key H has only 6 bits. After the first six bits (which behave as a "prefix"), a node cannot distinguish between key H and keys I, J and K, which have the identical first six bits followed by additional bits.

Figure 2:
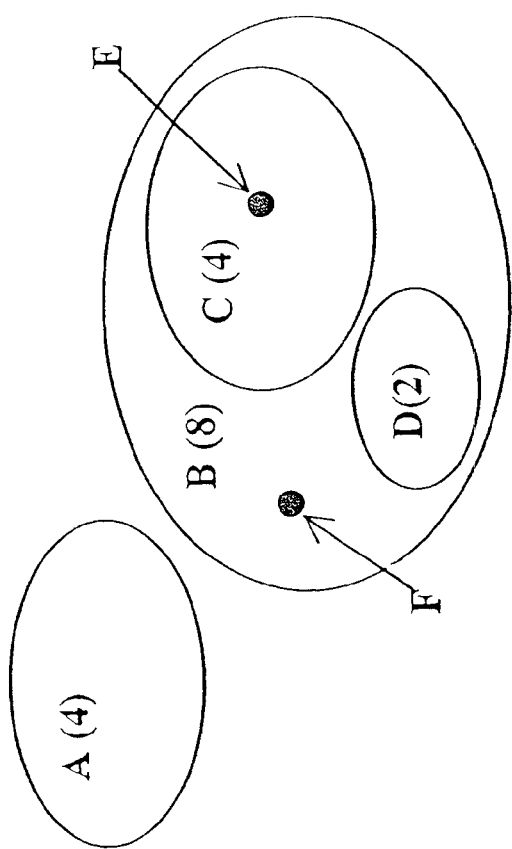
FIG. 2 is a Venn diagram representation of the wildcard-containing entries of Table 1.

Before describing various aspects of the present invention, it is important to understand the relationships between the entries in Table 1 From the Venn diagram representation provided in FIG. 2, it can be seen that entry B is the most general string, including within it strings C, D, E, and F. This is because string B is identical to strings C, D, E, and F in all the defined bits (Columns 0, 1, and 4). For the same reason, string C includes string E. Unlike strings C, D, E, and F, String A is represented by a circle outside of the circle representing string B, because string A has a value of 1 in column 1, as opposed to string B (and strings C, D, E, and F), which has a value of 0 in column 1.

Figure 3:
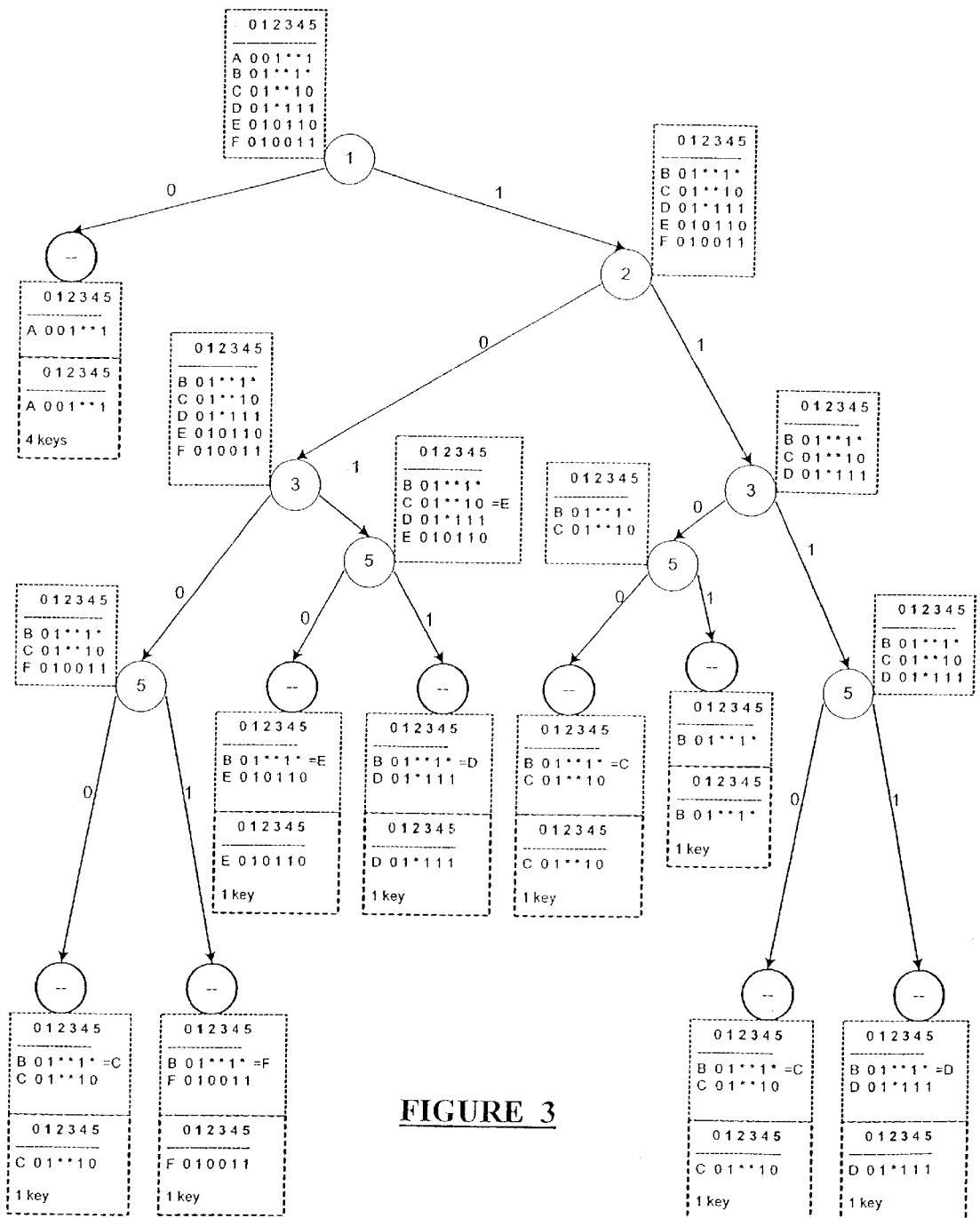
FIG. 3 is a radix-search tree having an inventive leaf containing a wildcard-containing entry having 4 keys ($A_1$–$A_4$)

String A, which contains wildcards at bit 3 and bit 4, can be specified by $2^2=4$ keys. Because the wildcard can equal zero or one, bit 3 and bit 4 do not have a singular value, and require nodes to distinguish between them according to the prior art. It is observed, however, that because keys $A_1$, $A_2$, $A_3$, and $A_4$ are all included within entry A, it is possible to reach keys $A_1$, $A_2$, $A_3$, and $A_4$ in a deterministic manner, even without additional nodes. Thus, we can expand the heretofore known duty of a leaf to include entries containing wildcards at the beginning or in the middle of the entry, and not just for the more restricted duties described above. Within the broader leaf of the present invention, keys $A_1$, $A_2$, $A_3$, and $A_4$ are all included, in list form, within one leaf. The use of the inventive leaf in the radix-search tree of FIG. 1 is demonstrated in FIG. 3. The nodes on the left-hand side of the tree that distinguish between the four keys in entry A have been eliminated in favor of one broad leaf of the present invention.

This idea can be further broadened to apply to what we term a "pseudo-node", which, as used herein in the specification and in the claims section that follows, refers to a bit within the set of entries being examined having at least one wildcard and not more than one defined value (i.e., either 0 or 1, but not both). According to the present invention, the bit can be eliminated as a node in such a case, with any "lost" information being stored in the leaves.

Looking, for example, at bit 2 of Table 1, we observe that entries B–F either equal 0, in the case of entries E and F, or contain a wildcard, in the case of entries B, C, and D. None of the entries being examined have a value of 1 (Note that entry A was already distinguished back at node 1). Thus, even though bit 2 does not have a singular value for entries B–F, there is no need to use bit 2 to distinguish between any of the entries, because at bit 2, all entries having a defined value (entries E and F) are included within entries having a wildcard (entries B, C, and D), and can be found in a deterministic fashion without establishing the pseudo-nodes as actual nodes in the tree structure.

As part of the inventive method, therefore, bit 2 is eliminated as a node. Instead of forcing the tree to distinguish between such entries, we simply store these entries together in one leaf.

Figure 4:
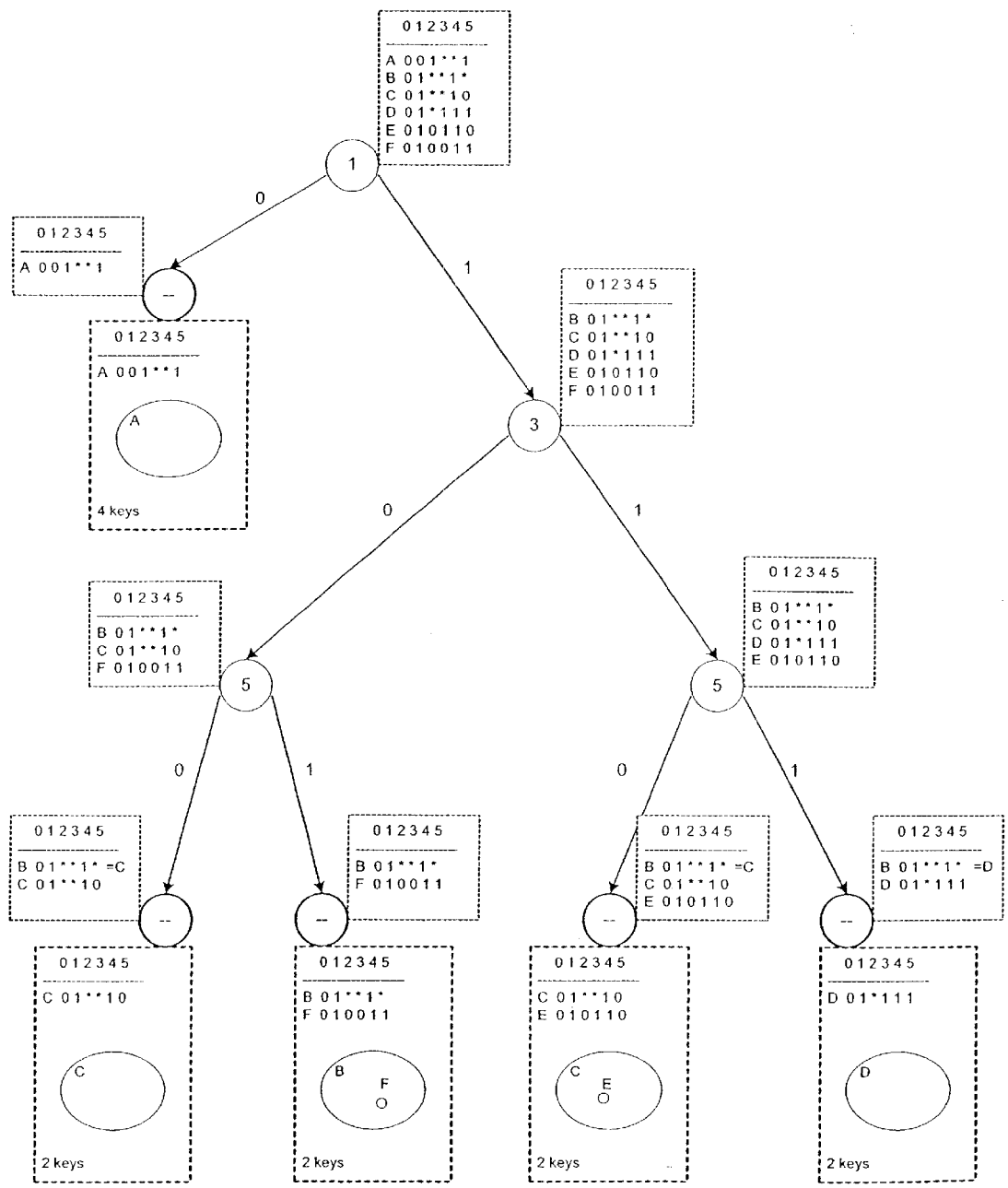
FIG. 4 is a radix-search tree having an inventive leaf that additionally can contain multiple entries belonging to a pseudo-node.

This is demonstrated in FIG. 4, in which is provided a radix-search tree having an inventive leaf that additionally can contain multiple entries belonging to a pseudo-node. Thus, from the root, we proceed to the right (bit 1=1) directly to bit 3, without examining bit 2.

For a bit 3 value of 1, we move right from node 3. The only entry that cannot equal 1 is entry F, such that entries B, C, D and E are represented. For a bit 3 value of 0, we move left from node 3. Entries D and E cannot equal 0, thus, entries B, C and F are represented. Note that because entries B and C are wildcards, they are represented both for the case of bit 3 equals 1 and for the case of bit 3 equals 0.

Proceeding now to bit 5, we further distinguish between entries B–F. For bit 3 equals 1, we must distinguish between entries B, C, D and E. For bit 3 equals 0, we must distinguish between entries B, C and F. For the case of (bit 3 equals 1 and) bit 5 equals 1, only entries B and D comply.

It should be noted that at this point in the path (i.e., bit 1=1, bit 3=1, bit 5=1), entries B and D are indistinguishable.

The selection of entry B or entry D must be based on predefined rules. As mentioned above, in the vast majority of networking applications, when a packet matches multiple prefixes, it is intuitively clear that the packet should be forwarded according to the most specific prefix or longest matching prefix. Here too, the more specific entry—entry D—is selected.

Proceeding along the same level of the tree, we examine the case of bit 3 equals 1 and bit 5 equals 0. As can be seen from Table 1, entries B, C and E comply. However, at this point in the path (and particularly after moving left at node 5), entries B and C have become indistinguishable, hence entry B, the less specific of the two entries, is eliminated. Note that we cannot eliminate entry C, even though entry E is included in entry C, because the two entries are distinguishable at bit 2, where entry E is specified, but entry C has a wildcard. If, by way of example, our search key is 010110, we would like entry E to be chosen, entry E being more specific than entry C. However, if our search key is 011110, entry E does not match, such that we want entry C to be selected.

As mentioned above, theoretically, we can distinguish between entries C and E by the addition of another node for bit 2: For (bit 3=1, bit 5=1, and) bit 2 equals 1, entry C is isolated; for bit 2 equals zero, entries C and E are indistinguishable, such that the more specific entry—entry E—would be selected.

If the value of bit 3 equals 0, we move left from the node, along with entries B, C and F. Bit 4 does not distinguish between entries B, C and F, as described above, hence, we proceed directly to bit 5.

If the value of bit 5 equals 0, we move left from the node, arriving at a leaf. The leaf contains entry B and entry C, or more specifically, $B_1$, $C_1$ and $C_3$. However, because entry B is more general than entry C, and given the assumption that the more specific string is preferred, entry B is eliminated, leaving solely C ($C_1$ and $C_3$) in the leaf.

If the value of bit 5 equals 1, we move right from the node, arriving at a leaf. The leaf contains entry B and entry F, or more specifically, $B_2$ and F. However, entry B is clearly more general than key F, hence, entry B is eliminated, leaving solely key F in the leaf.

Thus, according to the present invention, the leaf can store, not only entries containing multiple keys having the same "prefix", but families of entries that are sub-sets of one another. It has thus been shown that in addition to the above-described keys H, I, J, and K, a typical leaf according to the present invention can store keys of the form:

| | |
|---|---|
| L: | 01*11101 |
| M: | 01*11*01**0*1 |
| N: | 01**110* |
| O: | 01**1101 |

It may readily be seen that while L is a subset of O, and O is a sub-set of N, M is not related, since M is of a different length.

It has further been discovered by the inventors that the tree can be further compacted by choosing the order in which bits are incorporated into the tree. In Patricia-type methods, bits are checked in the order of appearance, as demonstrated in the prior art of FIG. 1 and in the inventive-leaf containing trees in FIG. 3 and FIG. 4. In the search tree according to one aspect of the present invention, however, bits can be checked out of (i.e., not in) the order of appearance.

It has been observed by the inventors that the tree can be simplified by selecting bits according to the bit having the minimum number of entries that contain a wildcard in the location of that particular bit. Thus, bit 1 is selected as the root (the Patricia trie of FIG. 1 and the search trees of FIGS. 3 and 4 also had bit 1 as the root, by coincidence: skipping bit 0, a non-distinguishing bit, bit 1 was simply the first distinguishing bit).

Figure 5:
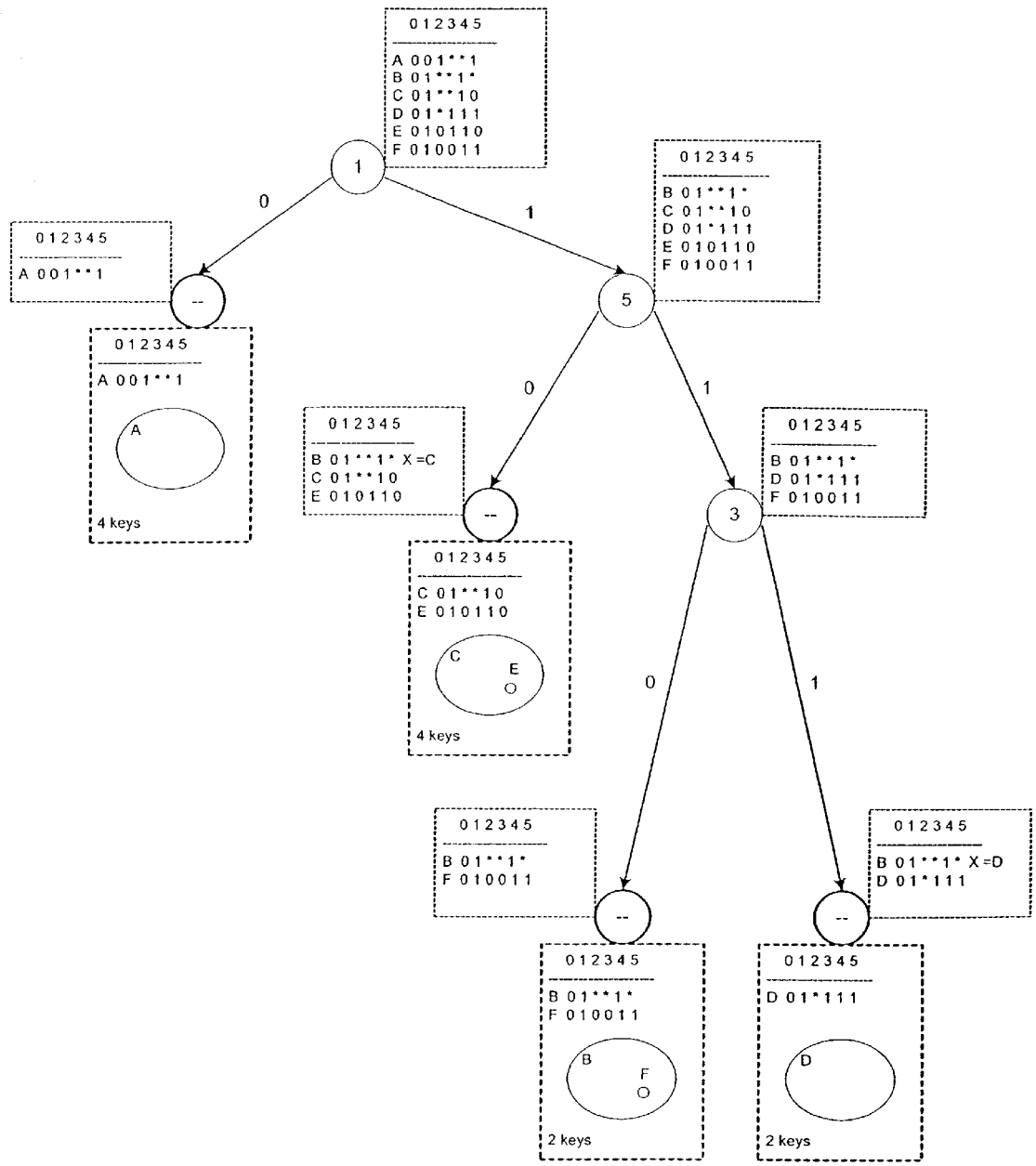
FIG. 5 is a radix-search tree having the inventive leaf of FIG. 4, in which the bits are checked according to the minimum number of wildcards.

FIG. 5 provides a radix-search tree having the inventive leaf of FIG. 4, but in which the bits are checked according to the minimum number of wildcards. Thus, the first bit to examine is bit 1, because bit 1 has zero wildcards (and not by coincidence, as above). For the case of bit 1 equals 1, we proceed along the right-hand side of the tree. Upon examination of bits 2–5, we find that bit 4 is now non-distinguishing. Of the remaining bits, bit 5 has the least number of wildcards, i.e., 1, hence bit 5 is selected as the next node. (Bit 2 is a pseudo-node, and is discussed below.)

If bit 5 equals 0, we move left from the node. Only entry B, entry C and entry E comply with the conditions bit 1 equals 1 and bit 5 equals 0. Entry B is eliminated from this part of the tree, since at this point in the path, it is indistinguishable from entry C and also more general. Thus, entry C and entry E remain, or more specifically, keys $C_1$, E, $C_3$, and $C_4$ (see expansion provided in Table 2). It can be seen that entry C and entry E are identical, except for bit 2 and bit 3. We observe, however, that regarding entry C and entry E, both bit 2 and bit 3 are pseudo-nodes and were skipped, hence, the entry C and entry E are placed together in one inventive leaf.

If bit 5 equals 1, we move right from the node with entries B, D and F. The only remaining bit that has not been skipped (bit 0, bit 4) and is not a pseudo-node (bit 2) is bit 3. If the value of bit 3 equals 0, we move left from the node, along with entry B and entry F. From the expansion provided in Table 2, only key $B_6$ and key F comply, such that only these two keys are stored in the leaf. If the value of bit 3 equals 1, we move right from the node, along with entry B and entry D. >From the expansion provided in Table 2, key $B_4$ equals key $D_1$ and $B_8$ equals key $D_2$. Being more specific, entry D, containing keys $D_1$ and $D_2$, is retained and stored in the leaf.

Thus, according to this aspect of the invention, the tree contains 3 nodes and 4 leaves. The tree has a maximum depth of 3 nodes, with 2 leaves having a depth of 3, 1 leaf having a depth of 2, and 1 leaf having a depth of 1. This compares favorably with the inventive tree of FIG. 4, which has 4 nodes and 5 leaves, and wherein 4 of the leaves have a depth of 3. Compared with trees constructed on the basis of prior art, the reduction in tree depth and the reduction in the number of branches is significantly more pronounced.

According to another aspect of the present invention, the bits are selected in an order that provides the best balance of the total number of single keys in both sub-trees. This principle is demonstrated in FIG. 6 and FIG. 7, using the entries provided in Table 4 below.

TABLE 4

|   | 0 | 1 | 2 | 3 | 4 | 5 | 6 | 7 | 8 |
|---|---|---|---|---|---|---|---|---|---|
| A | 0 | 0 | 0 | 1 | 1 | * | 1 |   |   |
| B | 1 | 0 | 0 | * | 1 | * | 0 |   |   |
| C | 1 | 1 | * | 0 | 1 | * | * | * |   |
| D | 1 | 1 | * | 1 | 0 | * | * | * | * |
| E | 1 | 1 | 1 | 0 | 1 | * | * | 0 |   |

Figure 6:
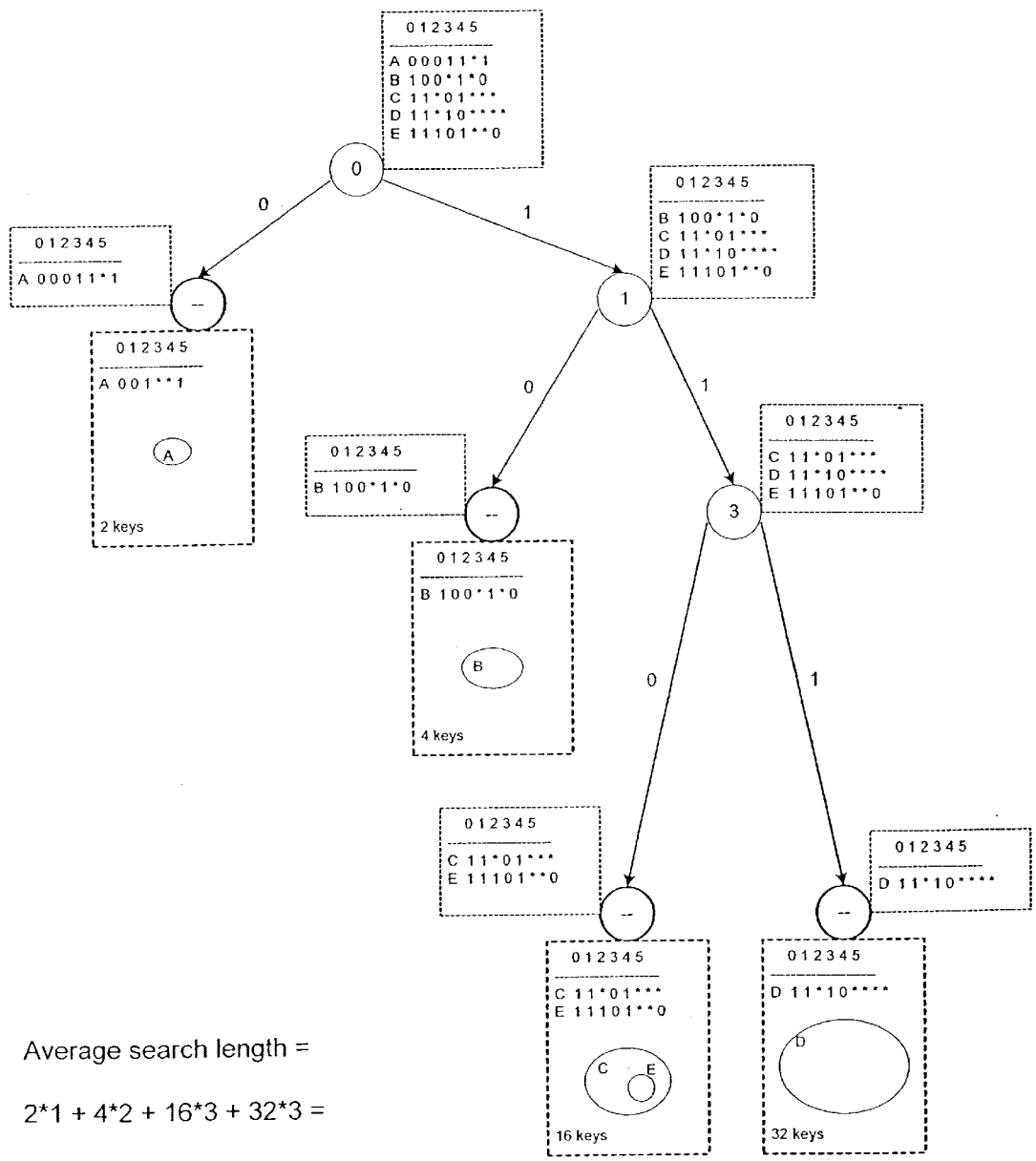
FIG. 6 provides a radix-search tree, for a different set of entries, in which the bits are checked according to the minimum number of wildcards.

FIG. 6 provides a radix-search tree according to the present invention, in which the bits are checked according to the minimum number of wildcards (which, coincidentally, is also the natural order). In the event that two or more bits have the same number of minimum wildcards, those bits are checked according to the order of appearance. Thus, bit 0, bit 1, and bit 4 all are distinguishing and have zero wildcards, and bit 0 is selected as the root of the sub-tree. For the case of bit 0 equals 1, we proceed along the right-hand side of the tree. Upon examination of bits 1–5, we find that bit 1 and bit 4 are both distinguishing and have zero wildcards, leading to the selection of bit 1. For the case of bit 1 equals 1, we proceed along the right-hand side of the tree. Upon examination of the remaining bits, we find that, upon separation of entry B, bit 3 remains distinguishing, but now has zero wildcards, such that bit 3 is selected. At this point, bit 4 is now non-distinguishing, and in fact, entry C and entry E can be inserted into the same leaf, according to an above-described facet of the invention.

In computing the average search length, we note that 2 single keys (corresponding to entry A) are found at a search depth of 1; 4 single keys (corresponding to entry B) are found at a search depth of 2; 48 single keys (16 corresponding to entry C and entry E, and 32 corresponding to entry D) are found at a search depth of 3. The average search depth (assuming uniform distribution upon the keys) is approximately 2.85.

Figure 7:
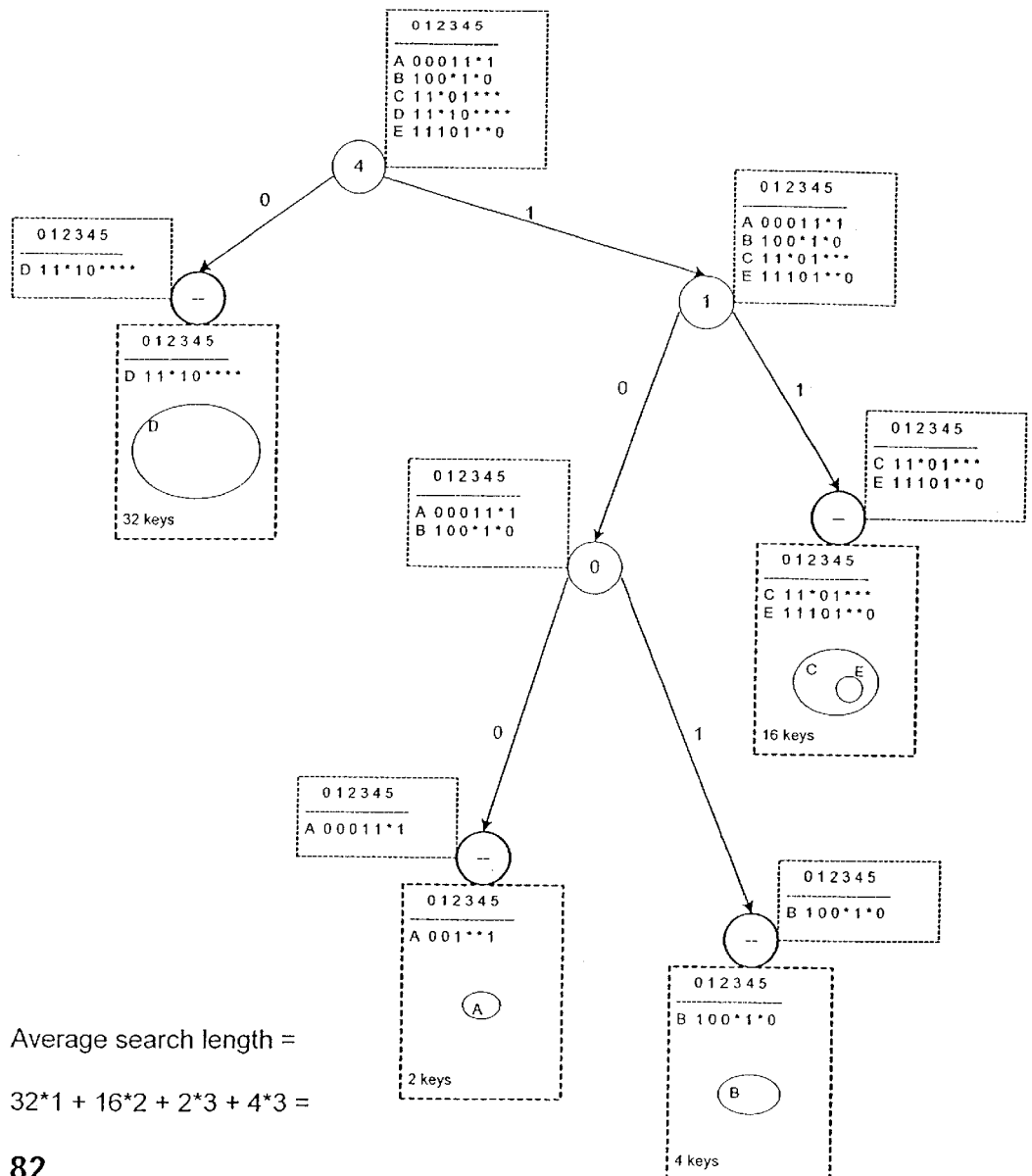
FIG. 7 illustrates a sub-tree according to another aspect of the present invention, in which bits are checked according to the optimal balancing of single keys within the sub-tree structure.

FIG. 7 provides a sub-tree according to another aspect of the present invention, in which bits are checked out of the order of appearance, according to the optimal balancing of single keys within the sub-tree structure. There is an advantage to accessing larger leaves, i.e., leaves containing larger pluralities of single keys, as early as possible in the search routine. Thus the inventive algorithm discerns that by choosing bit 4 as the root, entry D, containing 32 single keys, is distinguished from all the other entries, and is inserted into a single leaf having a search depth of 1.

For the case of bit 4 equals 1, we proceed along the right-hand side of the tree. Upon examination of bits 0, 1, 2, 3, and 5, we find that bit 0 and bit 1 are both distinguishing, and both have zero wildcards. However, by choosing bit 1, we can isolate 16 single keys corresponding to entry C and entry E (entry E being a subset of entry C), whereas the choice of bit 0 would isolate only 2 single keys corresponding to entry A. Thus, bit 1 is selected.

We observe that the sub-trees in FIG. 6 and FIG. 7 both have 4 leaves and 3 nodes in series (including the root as a node). However, from a computation of the average search length, we note that 32 single keys (corresponding to entry D) are found at a search depth of 1; 16 single keys (corresponding to entry C and entry E) are found at a search depth of 2; 6 single keys (corresponding to entry A and entry B) are found at a search depth of 3. The average search depth is approximately 1.5, close to ½ the value of the average search depth of the sub-tree of FIG. 6.

In the updating of a tree, there is a tradeoff between the speed of the updating and the balance of the tree. If, for example, the tree is completely rebuilt each time that an insertion or deletion is performed, the time invested in the updating/rebuilding is prohibitively long. The balance of the tree will, however, be close to optimal at all times.

If, however, many insertions and deletions are performed without rebuilding the tree (or one or more of the affected sub-trees), the updating process is fast, but subsequent retrieval times will be severely compromised by the imbalances in the tree structure.

Figure 8:
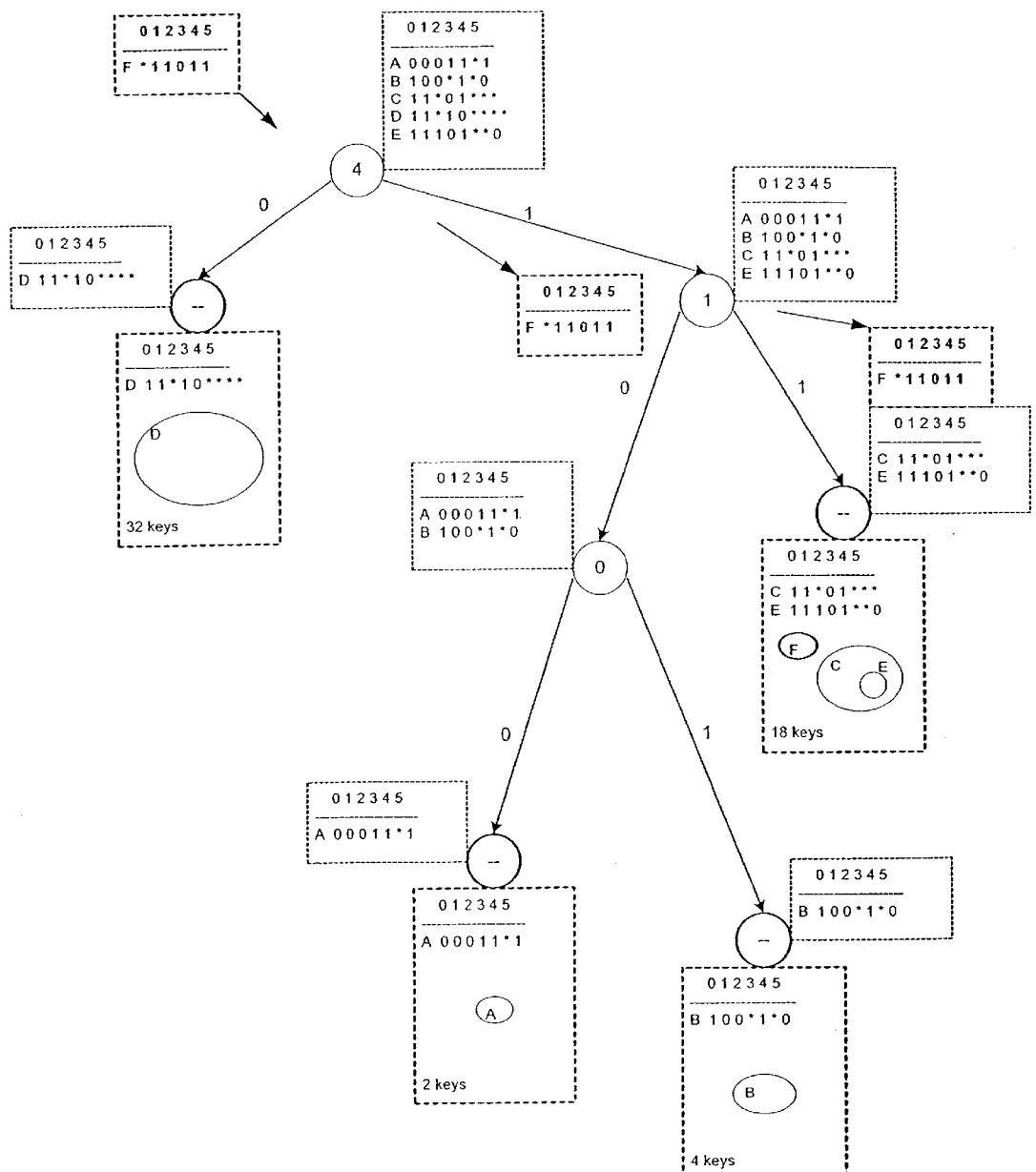
FIG. 8 illustrates the insertion of a new entry into the existing tree-structure of FIG. 7, wherein the new entry is incorporated into a single existing leaf.
Figure 9:
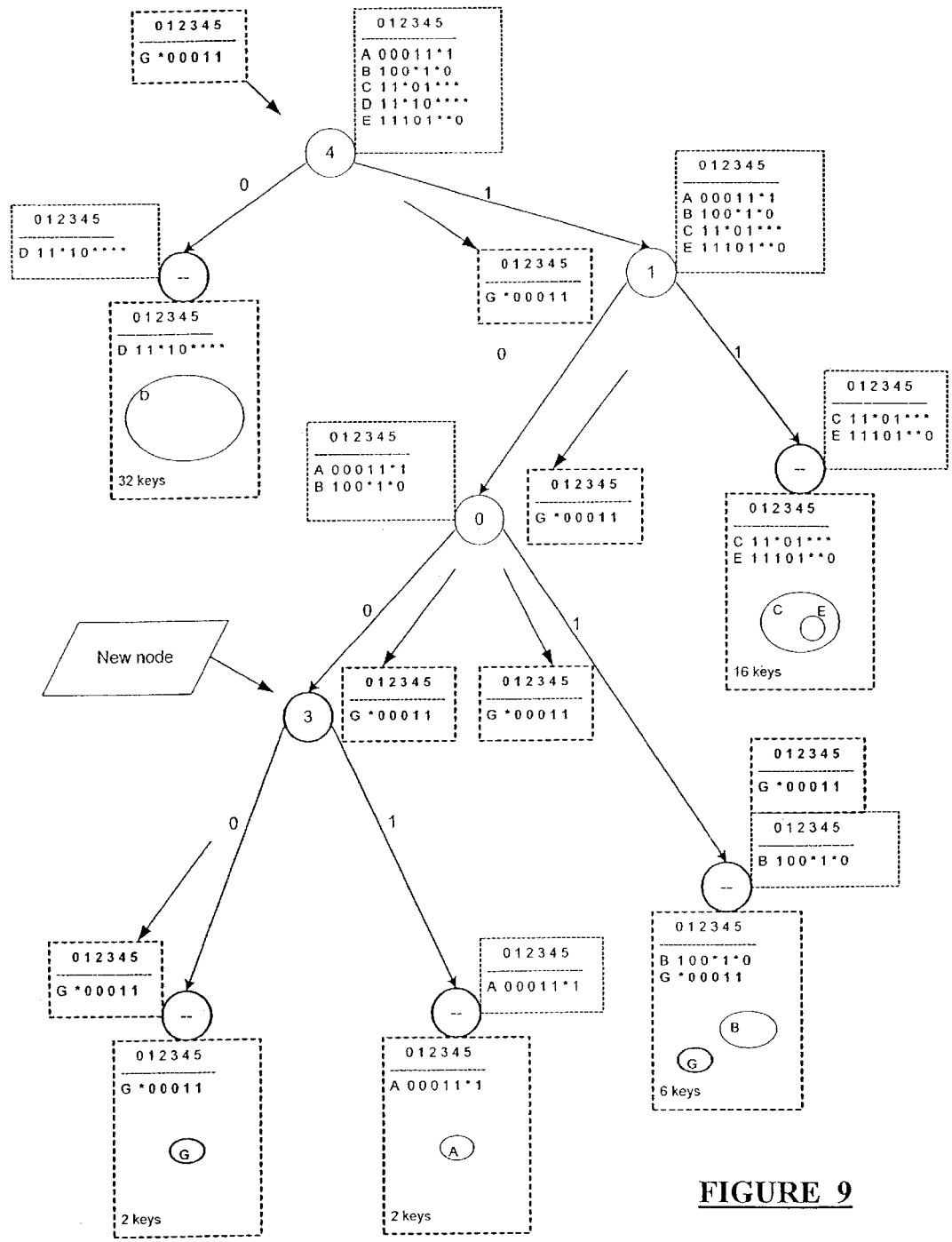
FIG. 9 illustrates the insertion of a new entry into the existing tree-structure of FIG. 7, wherein the new entry contains a wildcard.

An updating procedure according to the present invention is illustrated in FIG. 8 and in FIG. 9, wherein the basic tree structure is that of FIG. 7. In FIG. 8, we add new entry F to the existing tree structure; in FIG. 9, we add new entry G to the existing tree structure. New entry F and new entry G are provided in Table 5 below, along with original entries A–E.

TABLE 5

|   | 0 | 1 | 2 | 3 | 4 | 5 | 6 | 7 | 8 |
|---|---|---|---|---|---|---|---|---|---|
| A | 0 | 0 | 0 | 1 | 1 | * | 1 |   |   |
| B | 1 | 0 | 0 | * | 1 | * | 0 |   |   |
| C | 1 | 1 | * | 0 | 1 | * | * | * |   |
| D | 1 | 1 | * | 1 | 0 | * | * | * | * |
| E | 1 | 1 | 1 | 0 | 1 | * | * | 0 |   |
| F | * | 1 | 1 | 0 | 1 | 1 |   |   |   |
| G | * | 0 | 0 | 0 | 1 | 1 |   |   |   |

Referring now to FIG. 8, the insertion of new entry F into the tree structure is performed as follows: looking at the first node (bit 4) of the existing tree structure, we see that for entry F, bit 4 equals 1. Hence, we proceed to the right at bit 4, as if performing a retrieval operation. At the next node, bit 1 of entry F equals 1, hence we again proceed to the right, arriving at a leaf containing entry C and entry E. As is evident from the miniature Venn diagram representing this leaf (an 18-key leaf shown in FIG. 8), entry F does not intersect entry C and entry E, as entry F has a different number of bits. Since there is no node that can distinguish between entry F and entries C and E, entry F is incorporated into the existing leaf.

The updating operation described above is extremely fast, being comparable to a simple retrieving operation. However, the balance of the tree has been slightly compromised, which slightly reduces the average retrieval efficiency.

In FIG. 9, the insertion of new entry G into the tree structure is demonstrated. Examining the first node (bit 4) of the existing tree structure, we see that for entry G, bit 4 equals 1. Hence, we proceed to the right at bit 4. At the next node, bit 1 of entry G equals 0, hence we proceed to the left, arriving at a node corresponding to bit 0. Since for entry G, bit 0 is a wildcard, entry G must be recursively inserted on both sides of the node. For bit 0 equals 1, we proceed to the right, arriving at a leaf containing entry G. As is evident from the miniature Venn diagram representing this leaf (a 6-key leaf shown in FIG. 9), entry G does not intersect entry B, as entry G has a different number of bits. Since there is no node that can distinguish between entry G and entry B (note that at bit 2, the entries are indistinguishable, and bit 3 and bit 5 are pseudo-nodes), entry G is incorporated into the existing leaf containing entry B.

For bit 0 equals 0, we proceed to the left, arriving at a leaf containing entry A. Entry A and entry G are distinguishable at bit 3, hence, a new node is created in the tree structure, using the sub-tree building algorithm, in which bit 3 is examined. For bit 3 equals zero, we move to the left child, arriving at a new leaf containing solely entry G. For bit 3 equals one, we move to the right child, arriving at an old leaf containing solely entry A.

It must be emphasized, based on this particular example, that the inventive tree structure and method successfully address both the problem of incorporation of wildcard-containing entries (irrespective of wildcard location) and the incorporation of entries of varying length, into the tree structure. This is also true for matching and retrieval operations, as has been discussed above.

Based on various trade-off considerations that may vary considerably from application to application, a restructuring of the tree or a portion thereof will be called for from time to time. In most cases, the restructuring will be a local restructuring, for example, a restructuring of sub-trees attached to node 0 using the sub-tree building algorithm that will be described in greater detail below.

Figure 10:
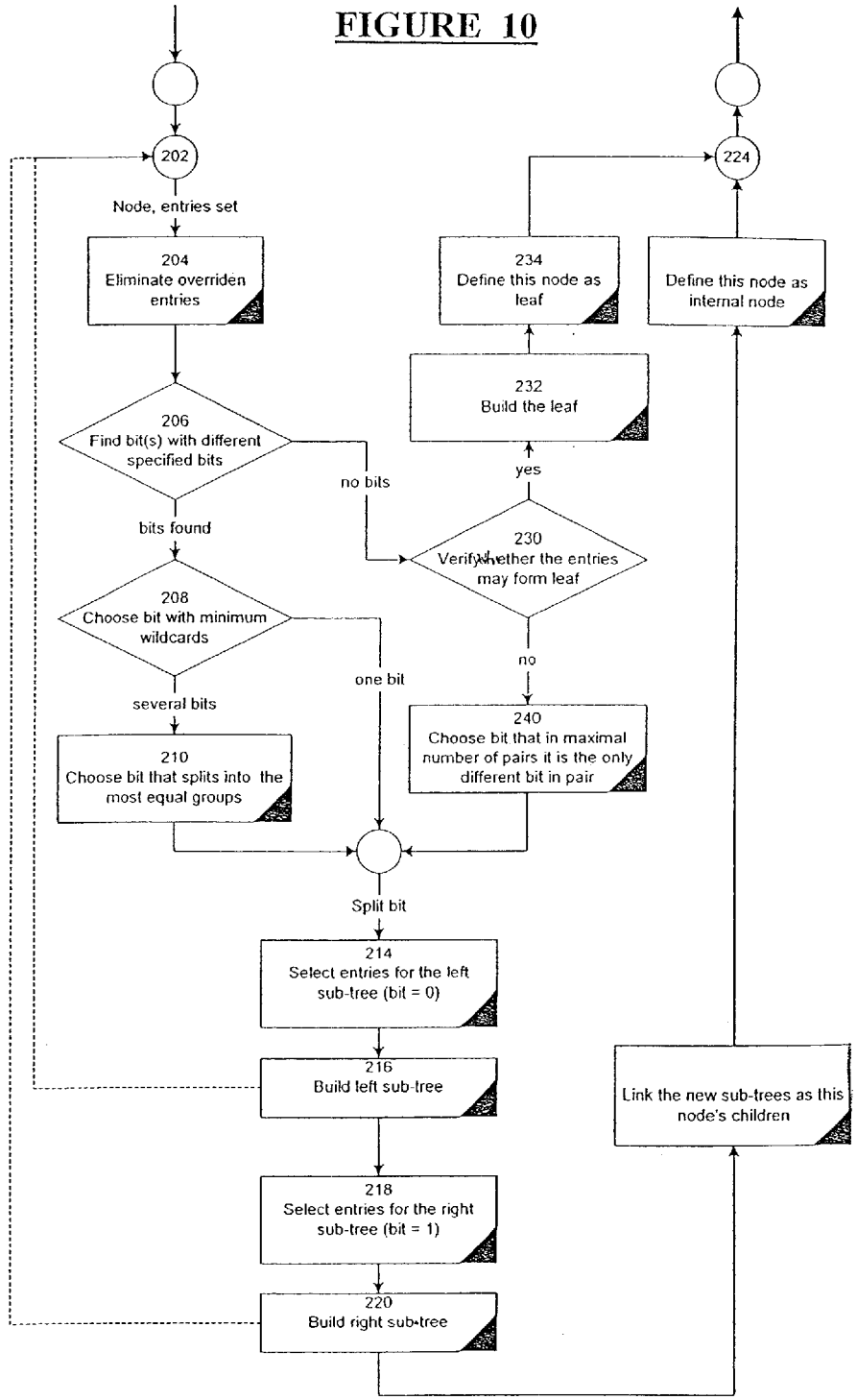
FIG. 10 is a logical flow diagram of a tree-building algorithm combining several aspects of the present invention.

FIG. 10 is a logical flow diagram of a tree-building algorithm 200 that combines several aspects of the present invention. In the algorithm, sub-trees are built 202 one at a time, in a recursive fashion. The input to the sub-tree building routine includes a set of the appropriate entries, i.e., the set of all entries that hit this node on the lookup path. As described above, the entries are examined and compared in an algorithm 204 in which more general entries, which are indistinguishable from one or more of the other entries according to the lookup path, ("overridden entries") are eliminated. In the next step 206, an algorithm searches for one or more bits having different specified values, i.e., bits in which at least one entry has a value of 1 and at least one entry has a value of 0. If this condition is met, the algorithm proceeds to step 208, where the bit having the least number of wildcards is selected. Often, several bits will have the identical number of minimum wildcards. In such a case, the bit selection can be performed based on various criteria. In step 210 of the logical flow diagram, the criterion used, by way of example, is optimal balancing of single keys within the sub-tree structure, as described above and as shown in FIG. 7. The algorithm then proceeds to step 214.

If at step 208 there is only one bit having the minimum number of wildcards, no additional criteria are necessary, and the algorithm proceeds directly to step 214, where entries for the left sub-tree are selected. Subsequently, the left sub-tree is built 216, entries for the right sub-tree are selected 218, and the right sub-tree is built 220.

If the condition at step 206 is not met, i.e., no bits have different specified values, the algorithm proceeds to step 230. At step 230, the algorithm verifies that the current set of entries can be inserted into one leaf. If the current set of entries can be inserted into one leaf, the algorithm proceeds to step 232, wherein the leaf is built. In step 234, the node is subsequently defined as a leaf, and the building of the sub-tree is completed.

It is possible that the current set of entries cannot be inserted into one leaf. For example, if the current set of entries contains 1,000 single keys, hardware limitations such as leaf size may prevent the inclusion of all the entries into a single leaf. In such a case, the algorithm proceeds to step 240, wherein the bits are re-examined. The selected bit in step 240 is the one which, for a maximal number of pairs, is the only different bit in the pair (i.e., in one entry of the pair, the bit is specified, and in the other entry in the pair, that bit is a wildcard, and all other bits in the pair are identical).

This approach eliminates the maximal number of entries in sub-trees. There are two sub-trees for this node. In one of the sub-trees, the specified entry of the pair will not appear, and in the other sub-tree, the unspecified entry (i.e., the entry having a wildcard at the selected bit) will be overridden by the specified entry that is more specific.

Consequently, the algorithm proceeds directly to step 214, and from there to step 216, as described above. Other aspects of the logical flow diagram are understood by those skilled in the art without further elaboration.

The algorithm is treated in further detail, by way of example, in the Appendix provided below.

Figure 11:
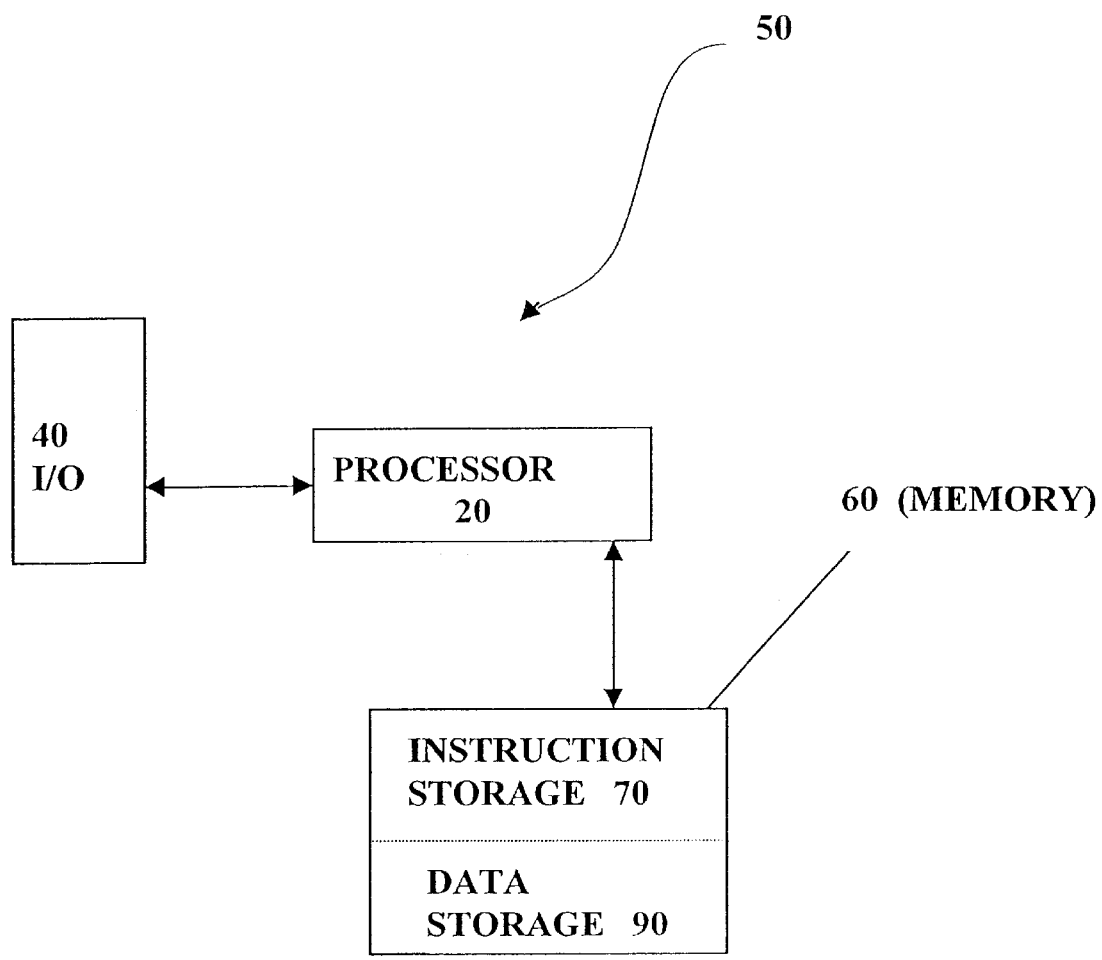
FIG. 11 is a block diagram of a system according to the present invention.

FIG. 11 is a block diagram of a system 50 according to the present invention. System 50 includes a processor 20, a memory 60, and an I/O block 40. Memory 60 includes an instruction storage area 70 and a data storage area 90. This general system architecture allows the processor 20 to access the data storage area 90 and retrieve the requisite information from the radix-search tree structure of the present invention.

As used herein in the specification and in the claims section that follows, the term "wildcard" refers to a bit located at a position that is within the length of an entry, in which the bit value is allowed to equal either 0 or 1, such that the wildcard-containing entry is actually a set containing subsets in which the wildcard bit is represented as 2 specified bits.

As used herein in the specification and in the claims section that follows, the term "defined bit" or "specified bit" are used interchangeably to refer to a bit having a definite value, i.e., either 0 or 1.

As used herein in the specification and in the claims section that follows, the term "leaf" refers to a group of one or more entries that need not be further divided.

As used herein in the specification and in the claims section that follows, the term "entry" refers to a set of one or more keys represented by a string of the following alphabet—{0,1,*}, where "*" signifies a wildcard (i.e., either bit equals 0 or bit equals 1 in the specified bit position).

As used herein in the specification and in the claims section that follows, the term "order of appearance" refers to the order in which bits appear in a key or entry. Examining bits in order of appearance belongs to conventional Patricia-trie methodology.

As used herein in the specification and in the claims section that follows, the term "primary position" refers to a position at the beginning or in the middle of an entry, after which at least one specified bit is present. Thus, the wildcard positioned in the 7th bit of the string 011101*0 is in a primary position, whereas the wildcard positioned in the 5th bit of the string 0111**** is part of a suffix.

As used herein in the specification and in the claims section that follows, the term "middle position" refers to a position in a string or entry that is both a non-prefix position and a non-suffix position, i.e., a bit preceded by a specified bit and followed by a specified bit. Thus, in the following string: string I=00110011*, bits 1–7 are middle position bits; bit 0 and bits 8–10** are prefix and suffix positions, respectively.

As used herein in the specification and in the claims section that follows, the term "sub-tree" refers to at least one node within a radix-search tree, which may be a leaf node.

As used herein in the specification and in the claims section that follows, the expression "best-balanced split" or "best-balanced split of single keys" refers to an ordering of bits in a sub-tree wherein the greatest number of single keys can be accessed as early as possible in the search routine. Such a split minimizes the average search depth and can significantly improve performance.

As used herein in the specification and in the claims section that follows, the expression "split bit" refers to a bit pertaining to a set of entries, in which the bit has different specified values (i.e., both 0 and 1). A split bit cannot be skipped according to classic Patricia-trie methodology.

It will be appreciated that the above descriptions are intended only to serve as examples, and that many other embodiments are possible within the spirit and the scope of the present invention.

APPENDIX

Algorithms
Overview
Lookup and SubTreeLookup are the algorithms that perform lookup for leafs that can contain the specified entry. Lookup is just the initialization part, SubTreeLookup is the recursive mechanism of looking in sub-tree.
BuildTree and BuildSubTree are the algorithms that build the tree statically, i.e. when all the entries are known at pre-build phase. BuildTree is just the initialization part. BuildSubTree is the algorithm that recursively builds the tree by building its sub-trees. It is the main algorithm of the suite, which is used both for static building of the tree and its dynamic rebuild.
UpdateEntry and RebuildSubTree are the algorithms that dynamically update an existing tree. UpdateEntry is just initialization and state-analysis phase. RebuildSubTree is the algorithm that recursively rebuilds the sub-trees of the tree.
POL_FindSplit is the algorithm that encapsulates the balancing considerations in building/rebuilding of the tree.
POL_RebuildHere is the algorithm that encapsulates the rebuild/lookup trade-off of the dynamic update of the tree.
Miscellaneous not detailed algorithms:
EliminateOverridenEntries is the algorithm that marks the entries that are overridden by finer entries after checking the given path. It is quite obvious and thus is not detailed.
SelectEntriesByBit is the algorithm that selects from the given entries the entries that will hit the sub-tree associated with the specified bit value. It is quite obvious and thus is not detailed.
Lookup

| | |
|---|---|
| Synopsis | Lookup( Tree, Entry ) |
| Input | Tree - the tree to start the lookup at (tree = root node). |
| | Entry - the entry to lookup for. |
| Output | A list of leaves the entry hits on lookup at Tree. |
| Initialization | LeafList = empty. |
| Algorithm | |

SubTreeLookup( Tree, Entry, LeafList )
Output LeafList
SubTreeLookup

| | |
|---|---|
| Synopsis | SubTreeLookup( Node, Entry, LeafList ) |
| Input | Node - node to start the lookup at. |
| | Entry - the entry to lookup for. |
| Output | LeafList - A list of leafs the entry hits on lookup from Node. |
| Complexity | Time O(sub-tree depth) ~= O(logN) |
| | Space O(1) |
| Initialization | None |
| Algorithm | |

APPENDIX-continued

```
If      Node is a leaf
        Then    LeafList += Node.
                Stop.
If      the bit of Entry at Node.SplitPosition is specified
        Then    If this bit is 0
                        Then    SubTreeLookup( Node.LeftSon, Entry, LeafList )
                        Else    SubTreeLookup( Node.RightSon, Entry, LeafList ).
        Else    (bit is undefined or wildcarded).
                SubTreeLookup( Node.LeftSon, Entry, LeafList ),
                And SubTreeLookup( Node.RightSon, Entry, LeafList ).
Output LeafList
```

BuildTree

| | |
|---|---|
| Synopsis | BuildTree( AllEntries ) |
| Input | AllEntries - the list of entries to build the tree from. |
| Output | The built patricia tree (root node). |
| Initialization | Tree = new Node. |
| | Path = EmptyPath. |

Algorithm

BuildSubTree( Tree, AllEntries, Path ).
Output Tree.

BuildSubTree

| | |
|---|---|
| Synopsis | BuildSubTree (Node, EntriesSet, Path ) |
| Input | Node - the root of the sub-tree to be built. |
| | EntriesSet - the set of entries which hit this node on the lookup path. |
| | Path - the set of indexes of bits that were checked in the path to Node. |
| Output | Node - the built sub-tree. |
| Complexity | Time    > O(N*logN*L) |
| | Space   > O(N*L) |
| Initialization | None. |

Algorithm

```
EliminateOverridenEntries( EntriesSet, Path ).
SplitLocation = POL_FindSplit( EntriesSet, Path ).
If      SplitLocation ==NO_NEED_TO_SPLIT
        < all the entries form leaf >
        Then    FormLeaf( Node, EntriesSet ). Stop.
Path += SplitLocation.
Node.LeftSon = new Node;
SonEntriesSet = SelectEntriesByBit( EntriesSet, SplitLocation, 0 ).
BuildSubTree ( Node.LeftSon, SonEntriesSet, Path ).
Node.RightSon = new Node;
SonEntriesSet = SelectEntriesByBit( EntriesSet, SplitLocation, 1 ).
BuildSubTree( Node.RightSon, SonEntriesSet, Path ).
```

POL FindSplit

| | |
|---|---|
| Synopsis | POL_findSplit( EntriesSet, Path ) |
| Input | EntriesSet - the set of entries to be split (if needed) |
| Output | Split location, or NO_SPLIT in case all of them form a leaf. |
| | Path - the set of indexes of bits that were checked in the path to Node. |
| Initialization | None. |

Algorithm

<
PHASE 1 - Splitting by abstract tree restrictions (split while there are different bits).
Find bit which is in different specified state. (0 or 1). In this case we have to split.
Simple case (equals classic patricia): find first bit in location order.
Balancing consideration 1: find bit number such that minimal number of entries contain WC in it.
This approach will minimize the number of leafs in tree.
Balancing consideration 2: find bit number that divides the group of entries (or group of all the
keys) into most equal groups, i.e., the bit that divides the entries into two groups (for left and right
sub-trees) in such way that divides the total amount of single keys into two mostly equal groups among
the sub-trees.
This approach will minimize the expected length of search for single key (where the single key
distribution is assumed to be uniform).
Balancing consideration 3:
The final algorithm will be a certain incorporation of the above considerations.
If no splitting needed at this phase (i.e., by tree restrictions the entries may form group), go to phase 2.
PHASE 2 - Splitting by hardware leaf representation restrictions (split further, when no different bits).
Check if a leaf can be formed from the entries. If yes, i.e., no splitting needed, return NO_SPLIT.
If a leaf cannot be formed, the entries set it must be split.
Algorithm for optimal splitting: find bit that in most pairs of entries (each for different length) it is
the only difference between the entries in pair (i.e. in one entry in pair this bit is specified, in other is
WC and the others are the same).
This approach will eliminate maximal number of entries in sub-trees. For each such pair, in one
sub-tree the corresponding entry in pair will not appear, and in other sub-tree the other entry in pair will
be overridden by the former entry.

APPENDIX-continued

\>
UpdateEntry

| | |
|---|---|
| Synopsis | UpdateEntry( Tree, Entry ) |
| Input | Tree - the root node of the existing tree. |
| | Entry - the entry to update. |
| Output | The updated tree. |
| Initialization | None. |
| Algorithm | |

```
EntryLeafs = Lookup( Tree, Entiy ).
If      EntryLeafs is empty <entry not found>
        Then    If        ADD_ENTRY
                          Then    Output RebuildSubTree( Tree, ADD, Entry ).
                Stop.
        Else    <entry is found, EntryLeafs contain all leafs that logically contain the entry>
                If        CHANGE_ENTRY
                          Then    For each Leaf in EntryLeafs do:    ChangeResult(Leaf, Entry).
                                  USR_TraceChange (Leaf)
                          Else    If      DELETE_ENTRY
                                          Then
                Stop.
```

RebuildSubTree

| | |
|---|---|
| Synopsis | RebuildSubTree( Node, OPERATION, Entry ) |
| Input | Node - the node whose sub-tree should be updated. |
| | OPERATION - ADD/DELETE; |
| | Entry - the entry to update. |
| Output | Node - The updated sub-tree. |
| Complexity | Time     O(logN) [in leaf] - O(N*logN*L) [whole tree] |
| | Space    O(1) [in leaf] - O(N*L) [whole tree] |
| Initialization | None. |
| Algorithm | |

```
If      POL_RebuildHere( Node, Entry )
        Then    < update by rebuilding the sub-tree from this Node >
                SubTreeEntries = CollectEntries( Node ).
                If        OPERATION == ADD
                          Then    SubTreeEntries += Entry.
                          Else    SubTreeEntries -= Entry.
                DeleteSubTree( Node )
                BuildSubTree( Node, SubTreeEntries ).
                USR_TraceChange( Node )
                Output Node. Stop.
< simulate lookup >
If      the bit of Entry at Node.SplitPosition is specified
        Then    If this bit is 0
                          Then    RebuildSubTree ( Node.LeftSon, OPERATION, Entry )
                          Else    RebuildSubTree ( Node.RightSon, OPERATION, Entry ).
        Else    <bit is undefined or wildcarded>
                RebuildSubTree ( Node.LeftSon, OPERATION, Entry )
                RebuildSubTree ( Node.RightSon, OPERATION, Entry ).
Output Node.
```

POL RebuildHere

| | |
|---|---|
| Synopsis | POL_RebuildHere( Node, Entry ) |
| Input | Node - the node where the update may start |
| | Entry - to update |
| Output | YES to update at the node, NO to go down. |
| Initialization | None. |
| Algorithm | |

<
Key ideas:
Simple case 1: return YES for the root node, i.e. rebuild the whole tree.
This approach will minimize the lookup time and sacrifice update time.
Simple case 2: return YES for the leaf node.
This approach will minimize the update time and sacrifice the lookup time since some building
considerations wouldn't be considered.
The final algorithm will be a certain compromise between the above simple cases.
The considerations may be the tree balancing state, system resources (memory, processing power), user
wishes, etc.
Simple compromising approach: return YES for the first node where the node's split bit is
wildcarded.
This approach will compromise between rebuild time and optimality of the rebuilt balancing state.
\>

What is claimed is:

1. A system for storing and retrieving data using a radix-search tree having a plurality of sub-trees containing nodes and leaves, the system comprising:
   (a) a data storage module designed and configured for storing the plurality of sub-trees, wherein at least one leaf of the leaves contains at least two entries, at least one entry of which has at least one wildcard, and
   (b) a processor that is operative to perform operations including:
      (i) building the radix-search tree in said data storage module,
wherein at least two of said entries contain a different number of bits with respect to one another.

2. The system of claim 1, wherein said data storage module is further designed and configured such that said at least one wildcard is locatable at any location within said entry.

3. The system of claim 1, wherein said at least two entries within said leaf have an identical prefix.

4. The system of claim 3, wherein said at least two entries are indistinguishable by a node.

5. The system of claim 1, said processor being further operative to perform:
   (ii) retrieving data from the radix-search tree in said data storage module.

6. The system of claim 1, wherein said at least one wildcard is followed by a bit forming a pseudo-node.

7. The system of claim 1, wherein said at least one wildcard is followed by a split bit.

8. The system of claim 1, wherein said at least one wildcard is in a middle position.

9. The system of claim 1, wherein said at least one wildcard is in a suffix position.

10. The system of claim 1, wherein said at least one entry having at least one wildcard in a primary position has a split bit preceding said at least one wildcard and a split bit following said at least one wildcard.

11. The system of claim 1, wherein at least one bit is checked out of order of appearance.

12. The system of claim 1, wherein said building of the radix-search tree in said data storage module includes ordering the nodes of at least one of the sub-trees, said ordering the nodes being performed by examining a bit having a minimum number of wildcards.

13. The system of claim 1, wherein said building the radix-search tree in said data storage module includes ordering the nodes of at least one of the sub-trees, said ordering the nodes being performed by examining a bit providing a best-balanced split of single keys in the sub-tree.

14. The system of claim 13, wherein said bit is selected according to a combination of selection criteria including:
   (a) a minimum number of wildcards in the sub-tree, and
   (b) a best-balanced split of single keys in the sub-tree.

15. The system of claim 12, wherein if at least two bits have said minimum number of wildcards, the nodes are ordered at least according to a bit providing a best-balanced split of single keys in said sub-tree.

16. The system of claim 1, wherein at least one of said entries disposed in said leaf is a sub-set of another one of said entries.

17. The system of claim 1, wherein said leaf contains at least three of said entries.

18. A method of storing and retrieving data using a radix-search tree having a plurality of sub-trees containing nodes and leaves, the method comprising the steps of:
   (a) providing a system including:
      (i) a data storage module for storing the plurality of sub-trees, wherein at least one leaf of the leaves contains at least two entries, at least one entry of which has at least one wildcard, and
      (ii) a processor, operatively connected to data storage module, and
   (b) building the radix-search tree in said data storage module,
wherein at least two of said entries contain a different number of bits with respect to one another.

19. The method of claim 11, wherein said at least one wildcard is locatable at any location within said entry.

20. The method of claim 18, wherein said at least two entries within said leaf have an identical prefix.

21. The method of claim 20, wherein said at least two entries are indistinguishable by a node.

22. The method of claim 18, further comprising the step of:
   (c) retrieving data from the radix-search tree in said data storage module.

23. The method of claim 18, wherein said at least one wildcard is followed by a bit forming a pseudo-node.

24. The method of claim 18, wherein said at least one entry having at least one wildcard in a primary position has a split bit preceding said at least one wildcard and a split bit following said at least one wildcard.

25. The method of claim 18, further comprising the step of:
   (c) checking at least one bit out of order of appearance.

26. The method of claim 18, wherein said building of the radix-search tree in said data storage module includes ordering the nodes of at least one of the sub-trees, said ordering the nodes being performed by examining a bit having a minimum number of wildcards.

27. The method of claim 18, wherein said building the radix-search tree in said data storage module includes ordering the nodes of at least one of the sub-trees, said ordering the nodes being performed by examining a bit providing a best-balanced split of single keys in the sub-tree.

28. The method of claim 27, wherein said bit is selected according to a combination of selection criteria including:
   (a) a minimum number of wildcards in the sub-tree, and
   (b) a best-balanced split of single keys in the sub-tree.

29. The method of claim 26, wherein if at least two bits have said minimum number of wildcards, the nodes are ordered at least according to a bit providing a best-balanced split of single keys in said sub-tree.

30. The method of claim 18, wherein at least one of said entries disposed in said leaf is a sub-set of another one of said entries.

31. The method of claim 18, wherein said leaf contains at least three of said entries.

* * * * *